C. T. HANSEN.
DRAFT EVENER.
APPLICATION FILED JAN. 9, 1915.
1,187,311.
Patented June 13, 1916.
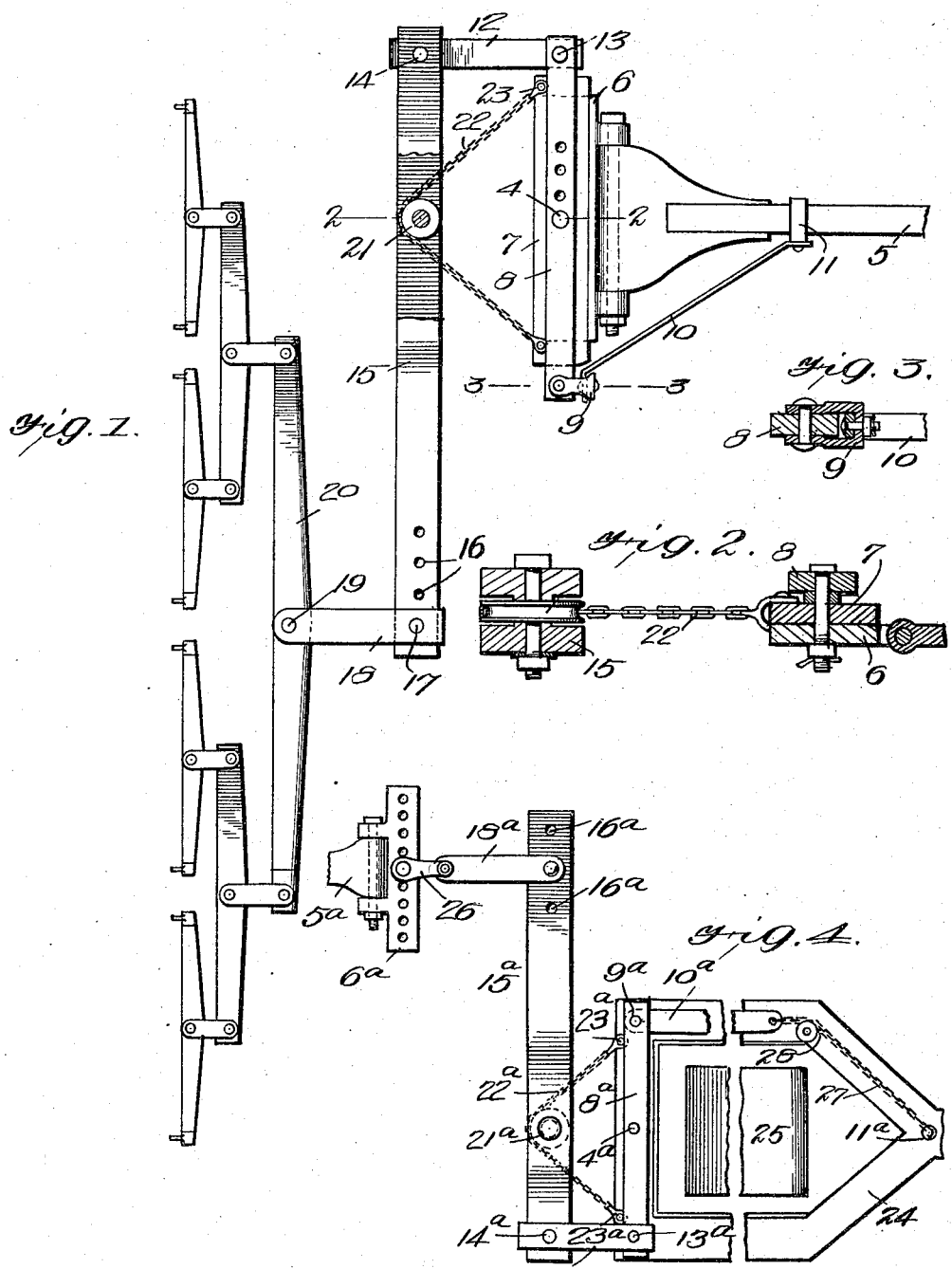
WITNESSES
F. G. Barry
Alan F. Garner.
INVENTOR
Cornelius T. Hansen
BY Munn & Co.
ATTORNEYS

UNITED STATES PATENT OFFICE.

CORNELIUS T. HANSEN, OF BIG SANDY, MONTANA.

DRAFT-EVENER.

1,187,311.                     Specification of Letters Patent.      Patented June 13, 1916.

Application filed January 9, 1915. Serial No. 1,391.

*To all whom it may concern:*

Be it known that I, CORNELIUS T. HANSEN, a citizen of the United States, residing at Big Sandy, in the county of Chouteau and State of Montana, have invented certain new and useful Improvements in Draft-Eveners, of which the following is a specification.

This invention relates to draft equalizers or eveners, and one of the principal objects of the invention is to provide an equalizer for attachment to a sulky or gang plow, and adapted to be attached to a tractor having but one bull wheel running in the furrow, the equalizer being adapted for use with a four horse evener of the common type in such manner that one horse will be placed in the furrow and three on the unplowed ground.

Another object of the invention is to provide an improved equalizer of few parts and of extreme simplicity, and one which will be durable and efficient in operation and inexpensive to manufacture.

A further object is to provide an equalizer to be used in connection with a four horse evener and arranged so that the equalizer may be shifted or set over relatively to the evener in accordance with the distance the plow is to be set over.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a plan view of an equalizer constructed according to my invention showing the same in use with a four horse evener. Fig. 2 represents a vertical longitudinal sectional view taken on the plane indicated by the line 2—2 of Fig. 1. Fig. 3 represents a vertical sectional view taken on the plane indicated by the line 3—3 of Fig. 1. Fig. 4 represents a plan view of an equalizer constructed according to my invention showing the same in use with a tractor.

Referring more particularly to the drawing, a plow beam is indicated at 5 and at its forward end carries a cross clevis 6. A bar 7 is secured upon the cross clevis, and above the bar an arm or lever 8 is centrally pivoted as at 4. This lever carries a clip 9 at one end, to which is secured the forward end of a brace 10. The latter is connected by a sleeve or other suitable means 11 to the plow beam rearwardly of the clevis.

To the opposite end of lever 8, a link 12 is at its rear end pivotally connected as at 13. The forward end of the link is pivoted at 14 to one end of a draw bar 15. The opposite end of the draw bar is provided with a plurality of openings 16, any one of which serves to receive a suitable pin 17, whereby a second link 18 may be pivoted at its rear end to the draw bar at the opposite end thereof from link 12. The forward end of link 18 is pivotally connected as at 19 to a four horse evener 20 of ordinary construction.

Journaled upon draw bar 15 in alinement with plow beam 5 is a pulley 21. A chain or other suitable flexible element 22 runs over the pulley and is connected at its ends by means of suitable clips 23 to the opposite ends of bar 7. The chain or flexible element 22 serves to maintain the draft bar in parallel relation with the lever 8.

The draw bar 15 is made of two strips of material suitably welded or riveted together except along the portion where the pulley 21 and link 12 are connected, along which portion the strips are oppositely bulged away from each other so that the pulley and link may be connected to the draw bar between the strips and in the central line of the bar.

It will be noted by the arrangement I provide that three of the horses will be placed to one side of the plow beam whereby they may tread upon the unplowed ground, while the fourth horse is disposed in alinement with the plow beam and will walk in the furrow. Upon a pull in the direction of travel of the plow beam being imparted to the outer end of the draw bar through the medium of link 18, the inner end of the bar will tend through the medium of link 12 to shift the arm or lever 8 backwardly at point 13 and forwardly at the end to which the brace 10 is connected, thus imparting a forward pull to the brace and plow beam. The pulley 21 being in alinement with the plow beams co-acts with the chain 22 in imparting the direct forward pull to the beam. The plurality of openings 16 is provided so that the four horse evener may be shifted relatively to the draw bar or vice versa in accordance with the distance the plow is to be set over or shifted.

In Fig. 4 I have shown the manner in which the equalizer may be utilized with a tractor. The principle of operation of the device shown in Fig. 4 is substantially as that already described. In the figure, I have shown a portion of the framework of a tractor at 24. The bull wheel is indicated at 25 and is adapted to travel in the furrow. The draw bar is indicated at 15ª, chain at 22ª, pulley at 21ª, a lever at 8ª, the link connecting the lever and draw bar at 12ª, and the link corresponding to link 18 is shown at 18ª. This link is pivotally connected by means of a link 26 with the cross clevis 6ª of the plow beam 5ª. The lever 8ª is pivoted to the framework 24 at 4ª in alinement with the bull wheel and the pulley 21ª. The brace 10ª is pivotally connected at its rear end at 9ª to the opposite end of lever 8ª from the end to which link 12ª is connected. Said brace 10ª at its forward end is provided with a chain 27. The chain is connected at its free end to the framework 24 at point 11ª in alinement with the bull wheel and points 4ª and 21ª. The pulley 28 is provided on the framework over which the chain 27 extends. The brace 10ª and chain 27 are substituted for and perform the function of brace 10. The ends of chain 22ª are connected at 23ª to the framework 24 at equidistant points from pivot point 4ª. The main differences in the arrangement shown in Fig. 4 from that shown in Fig. 1, is that the direction of pull through the various parts is reversed, the principle upon which both devices operate being the same.

Although I have described the preferred embodiment of my invention, I may desire to make such changes in the construction, combination and arrangement of parts thereof as do not depart from the spirit of the invention and the scope of the appended claims.

I claim:—

1. The combination with a plow beam, of a bar secured transversely thereof, a lever centrally pivoted upon the bar at a point in alinement with the plow beam, a brace connected at one end to the plow beam and at its opposite end to one end of the lever, a link pivotally connected at its rear end to the opposite end of the lever, a draft bar pivotally connected at one end to the link at the forward end of the latter and extending transversely of the plow beam, a pulley journaled upon the draft bar in alinement with the plow beam, a chain connected at its ends to said bar on opposite sides of the plow beam, and engaging over said pulley, a second link pivotally connected to the end of the draft bar opposite the end to which first said link is connected, and a four horse evener pivotally connected to the second link, in such manner that when draft animals are hitched thereto one of them will be in alinement with the plow beam, and the others will be disposed on one side of the plow beam, substantially as described.

2. The combination with a plow beam, of a link pivotally connected to the beam at a point in alinement therewith, a brace connected to one end of the link and to the plow beam, a draft bar extending transversely of the plow beam and having a link connection with the opposite end of the lever, means connected with the plow beam for pivotally connecting said draft bar therewith at a point in alinement with the plow beam, a four horse evener, and means for connecting the four horse evener with the opposite end of the draft bar.

3. The combination with a plow beam, of a lever pivotally connected thereto, a brace connected to one end of the lever and to the plow beam, a draft bar disposed transversely of the plow beam and having a link connection with the opposite end of the lever, a pulley carried by the draft bar, and a flexible element engaging said pulley and connected to the plow beam in such manner as to dispose the pulley in alinement with the plow beam, and means for hitching draft animals to the opposite end of the draft bar.

4. A draft equalizer comprising a draft bar, a lever adapted to be pivotally connected to a vehicle and having a link connection to one end of the draw bar, a brace connected at one end to the opposite end of the lever and adapted to be connected to the vehicle, means whereby the draft bar may be pivotally connected with a vehicle at a point in alinement with the direction of travel of the vehicle and with the pivotal point of the lever, and means for connecting a source of power to the opposite end of the draft bar from that to which the lever is connected.

5. A draft equalizer comprising a draw bar, a lever having a link connection with one end of the draw bar, a brace connected to the opposite end of the lever, said brace and lever adapted to be connected to a source of pulling force, means for pivotally connecting the draw bar with the source of pulling force in alinement with the line of pull and the point at which the lever is pivoted, and means for connecting a second source of pulling force at the opposite end of the draw bar from that connected with the lever.

CORNELIUS T. HANSEN.

Witnesses:
   E. D. HARNDEN,
   A. H. GREENWALT.

Copies of this patent may be obtained for five cents each, by addressing the "Commissioner of Patents, Washington, D. C."